US012646931B2

(12) United States Patent
Bühler et al.

(10) Patent No.: US 12,646,931 B2
(45) Date of Patent: Jun. 2, 2026

(54) SURGE ARRESTER FOR DC MAINS AND METHOD OF OPERATING SUCH A SURGE ARRESTER

(71) Applicant: DEHN SE, Neumarkt i.d. OPf. (DE)

(72) Inventors: Klaus Bühler, Neumarkt (DE); Arnd Ehrhardt, Neumarkt (DE); Marco Kellermann, Burgthann (DE)

(73) Assignee: DEHN SE, Neumarkt i.d.OPf. (DE)

( * ) Notice: Subject to any disclaimer, the term of this patent is extended or adjusted under 35 U.S.C. 154(b) by 203 days.

(21) Appl. No.: 18/409,311

(22) Filed: Jan. 10, 2024

(65) Prior Publication Data

US 2024/0266824 A1      Aug. 8, 2024

(30) Foreign Application Priority Data

Feb. 2, 2023      (DE) .......................... 102023102619.4

(51) Int. Cl.
*H02H 9/04*               (2006.01)
(52) U.S. Cl.
CPC ..................................... *H02H 9/04* (2013.01)
(58) Field of Classification Search
CPC ............ H02H 9/04; H02H 9/043; H02H 9/06; H02H 9/02; H02H 9/041; H01T 1/14; H01T 2/02; H01T 15/00; H01T 1/02; G06N 20/00
USPC ........................................................ 361/117
See application file for complete search history.

(56) References Cited

U.S. PATENT DOCUMENTS

| | | | | |
|---|---|---|---|---|
| 3,590,319 | A | * | 6/1971 | Baltensperger ........ H02H 9/005 |
| | | | | 361/10 |
| 8,982,525 | B2 | * | 3/2015 | Durth ....................... H01C 7/12 |
| | | | | 361/111 |
| 9,111,698 | B2 | | 8/2015 | Crevenat |
| 11,705,724 | B2 | | 7/2023 | Ehrhardt et al. |
| 11,749,481 | B2 | | 9/2023 | Ehrhardt et al. |
| 11,764,570 | B2 | | 9/2023 | Ehrhardt et al. |

(Continued)

FOREIGN PATENT DOCUMENTS

| | | | | | |
|---|---|---|---|---|---|
| CN | 117083773 | A | * | 11/2023 | .............. H02J 13/12 |
| DE | 119096 | A1 | | 4/1976 | |

(Continued)

OTHER PUBLICATIONS

Hirschmann; Switching Device for overvoltage protection device; EP 3166193; entire specification and drawings (Year: 2017).*

*Primary Examiner* — Dharti H Patel
(74) *Attorney, Agent, or Firm* — Bodner & Bodner, PLLC; Christian P. Bodner; Gerald T. Bodner

(57) ABSTRACT

A surge arrester for DC mains comprises a spark gap for extinguishing mains follow currents in the DC mains, the current intensity of which is equal to or greater than a specified current threshold, and a triggerable extinguishing aid assigned to the spark gap, which is set up to extinguish mains follow currents below the specified current threshold. The surge arrester further comprises an evaluation module for triggering the extinguishing aid, the evaluation module being set up to trigger the extinguishing aid as soon as at least two tripping conditions are fulfilled which are characteristic of the fact that the spark gap alone 10 cannot extinguish the mains follow current within a specified time duration. Furthermore, a method of operating such a surge arrester is described.

16 Claims, 6 Drawing Sheets

(56)         References Cited

U.S. PATENT DOCUMENTS

| | | | |
|---|---|---|---|
| 2013/0063845 A1 | 3/2013 | Durth et al. | |
| 2013/0100558 A1 | 4/2013 | Crevenat | |
| 2016/0013631 A1* | 1/2016 | Ehrler ...................... | H02H 9/04 |
| | | | 361/91.1 |
| 2016/0035529 A1* | 2/2016 | Durth ..................... | H01H 85/20 |
| | | | 337/18 |
| 2022/0085577 A1 | 3/2022 | Ehrhardt et al. | |
| 2022/0085579 A1* | 3/2022 | Lange ...................... | H01T 2/02 |
| 2022/0208498 A1* | 6/2022 | Ehrhardt ................... | H01T 1/02 |
| 2022/0209530 A1 | 6/2022 | Ehrhardt et al. | |
| 2024/0305087 A1* | 9/2024 | Krauss ..................... | H01T 1/14 |

FOREIGN PATENT DOCUMENTS

| | | | | | |
|---|---|---|---|---|---|
| DE | 2608264 | A1 | 11/1976 | | |
| DE | 10211796 | A1 | 7/2003 | | |
| DE | 102007015933 | A1 | 7/2008 | | |
| DE | 102011053415 | A1 | 3/2013 | | |
| DE | 102015013222 | B3 * | 12/2016 | .............. | H01T 2/02 |
| DE | 102016211628 | A1 | 12/2017 | | |
| DE | 102019101200 | A1 | 1/2020 | | |
| DE | 102019101212 | A1 | 1/2020 | | |
| DE | 102019210234 | B3 | 10/2020 | | |
| DE | 102019210236 | A1 | 11/2020 | | |
| DE | 102021208076 | A1 * | 2/2023 | ............ | H02H 3/205 |
| EP | 2568480 | A2 | 3/2013 | | |
| EP | 2631927 | A1 | 8/2013 | | |
| EP | 3166193 | A1 * | 5/2017 | ............ | H02H 9/041 |
| EP | 2631927 | B1 | 12/2019 | | |
| FR | 2873509 | A1 * | 1/2006 | .............. | H01T 2/02 |
| WO | WO-2005074083 | A1 * | 8/2005 | .............. | H01T 2/02 |
| WO | WO2008080667 | A1 | 7/2008 | | |
| WO | WO-2014166751 | A1 * | 10/2014 | .......... | H01H 37/767 |

* cited by examiner

SURGE ARRESTER FOR DC MAINS AND METHOD OF OPERATING SUCH A SURGE ARRESTER

TECHNICAL FIELD OF THE DISCLOSURE

The present disclosure relates to a surge arrester for DC mains and to a method of operating such a surge arrester.

BACKGROUND

Surge arresters based on spark gaps are used to discharge transient disturbance variables in low-voltage supply mains.

So-called "mains arresters", i.e. surge arresters, which are generally arranged between the phases and the neutral or protective conductor of an electric mains, should be able to discharge direct or coupled-in impulse currents, for example caused by lightning events, and to safely prevent or interrupt mains follow currents in the mains without causing an interruption of the mains supply for consumers in the DC mains.

Various technologies have been established for the AC mains usual so far, by means of which it is also possible to limit comparatively high prospective mains follow currents. For smaller currents of up to a few hundred amperes and, in some cases, for previously limited mains follow currents, an extinction is realized in a final step by a polarity change in the natural current zero crossing in the AC mains.

However, when the supply mains are converted to DC voltage, the natural current zero crossing no longer applies. This also eliminates the natural extinguishing of smaller or only limited mains follow currents. In addition, it is not possible to assume defined short-circuit currents to which protective devices could be purposefully adapted. The level of the short-circuit currents, the feed-in direction and also the time constant of the DC mains can vary greatly. Already known extinguishing principles from AC mains are therefore not readily applicable to DC mains.

High prospective short-circuit currents of several 10 kA can be limited with so-called horn spark gaps. Such horn spark gaps include, in particular, an ignition area in which the spark gap ignites, an extinguishing chamber for extinguishing the arc, and a running area located between the ignition area and the extinguishing chamber through which the ignited arc must pass such that it can be extinguished in the extinguishing chamber. However, for small direct currents with current intensities of up to a few hundred amperes, the arc may pass through the running area only slowly or not at all, so that the horn spark gap may be damaged.

Document DE 10 2007 015 933 A1 discloses an overvoltage protective device for use in photovoltaic systems having an electronic hybrid circuit. This is characterized by a semiconductor component connected in parallel with the spark gap, which is activated after each ignition of the spark gap and serves to extinguish any mains follow currents which may occur. The disadvantage of this solution is that the semiconductor component must be able to control the entire prospective mains follow current. This limits the maximum performance of the overvoltage protective device. In addition, the costs of the semiconductor component to be respectively used are directly linked to the maximum current to be controlled.

Document DE 10 2011 053 415 A1 discloses an overvoltage protective device having a first discharge path and a second discharge path, wherein the first discharge path has a spark gap and the second discharge path has a triggerable switch and a series-connected thermistor. Furthermore, the overvoltage protective device has a control means which, based on the state and/or the course of the state of the first discharge path, can cause the triggerable switch to switch through in case of an arrester event.

Document DE 102 11 796 A1 shows an overvoltage protective device having a selection assembly which is independent of a mains and supply voltage and which monitors overvoltage events occurring between a system part to be protected and earth to detect transient and static events and in which, depending on the type of event, a dynamic short-circuit switch and/or a static short-circuit switch of the overvoltage protective means is/are activated.

The object is to provide a surge arrester which is adapted to reliably extinguish DC follow currents over a wide current intensity range. In particular, the surge arrester should also be adapted to be implemented in a cost-effective manner.

SUMMARY

This object is achieved by a surge arrester for DC mains, comprising a spark gap for extinguishing mains follow currents in the DC mains, the current intensity of which is equal to or greater than a specified current threshold, and a triggerable extinguishing aid assigned to the spark gap, which is set up to extinguish mains follow currents below the specified current threshold. The surge arrester further comprises an evaluation module for triggering the extinguishing aid, the evaluation module being set up to trigger the extinguishing aid as soon as at least two tripping conditions are fulfilled which are characteristic of the fact that the spark gap alone cannot extinguish the mains follow current within a specified time duration.

This object is further achieved by a method of operating a surge arrester for DC mains, comprising the following steps: detecting by means of an evaluation module of the surge arrester whether at least two tripping conditions are fulfilled which are characteristic of the fact that a spark gap of the surge arrester alone cannot extinguish an occurring mains follow current in the DC mains within a previously specified time duration. If this is the case, an extinguishing aid of the surge arrester is triggered by means of the evaluation module.

The present disclosure is based on the basic idea of only purposefully activating the extinguishing aid if the spark gap itself is not able to extinguish the occurring mains follow current within a previously specified time duration. This means that the extinguishing aid remains passive in the event of impulse current loads and mains follow currents which can be reliably controlled by the spark gap itself. This makes it possible to design the components of the extinguishing aid only for loads with a current intensity below the specified current threshold, so that the costs of the surge arrester according to the present disclosure can be minimized without impairing the reliability of discharging impulse currents and extinguishing mains follow currents.

According to the present disclosure, the evaluation module trips the extinguishing aid only when several characteristic tripping conditions are fulfilled. In other words, the evaluation module is set up to activate the extinguishing aid as soon as several conditions are present, in particular several conditions in relation to the mains follow current, in which the spark gap alone cannot extinguish the mains follow current within the specified time duration.

The tripping conditions to be considered are adapted to the type and mode of operation of the spark gap and extinguishing aid respectively used.

The type of spark gap is not fundamentally restricted any further, so that the surge arrester according to the present disclosure can be flexibly adapted to the respectively intended place of use.

In one variant, the spark gap is a horn spark gap or a gas tube arrester. Such spark gaps are particularly suitable for reliably handling impulse currents and are available worldwide at low costs.

Preferably, the spark gap is a horn spark gap, which comprises an ignition area for igniting an arc, an extinguishing chamber for extinguishing the arc, and a running area located between the ignition area and the extinguishing chamber, through which the arc can run to pass from the ignition area into the extinguishing chamber.

In a further variant, the spark gap is a spark gap which operates on the principle of a pressure build-up or a gas flow in an arc channel.

Accordingly, one aspect provides that the extinguishing aid remains passive if the spark gap itself is able to extinguish the occurring mains follow current within the previously specified time duration, and wherein the extinguishing aid is activated when the spark gap itself is not able to extinguish the occurring mains follow current within the previously specified time duration. In other words, the surge arrester has an active operating mode (with activated extinguishing aid) and a passive operating mode (with passive extinguishing aid). However, a mains follow current is extinguished both in the passive operating mode and in the active operating mode, namely either by the spark gap itself or by the support of the activated extinguishing aid.

The at least two tripping conditions can be based on at least two of the following parameters: an occurrence, a movement and/or a burning duration of an arc in the spark gap, a tripping of an ignition aid of the spark gap, a current flow in the path of the DC mains assigned to the surge arrester, and a falling below the specified current threshold in the path of the DC mains assigned to the surge arrester, in particular after the specified time duration.

The occurrence, the movement and/or the burning duration of an arc are particularly suitable for determining the behavior of the spark gap.

Where and in what form the arc occurs and the extent to which the arc moves depends on the type of spark gap respectively used.

If no arc occurs, this may be an indication that the current threshold has not been reached. In this case, it is only necessary to determine via a further condition whether or not a current having a current intensity below the threshold value must be handled via the extinguishing aid.

The movement and/or the burning duration of the arc allow conclusions to be drawn about the present current intensity of an impulse or mains follow current, wherein a higher current intensity generally leads to faster movement and a shorter burning duration of the arc.

In particular, it can be determined as a tripping condition that the arc remains in the ignition range. This may be due to a mains follow current below the specified current threshold and/or ageing effects of the spark gap, which require the spark gap to be supported by the extinguishing aid.

The tripping of an ignition aid of the spark gap allows conclusions to be drawn about the start of the occurrence of an arc in the spark gap. For example, the ignition aid may include a gas tube arrester, the ignition of which is used as a signal tripping the ignition aid. For this purpose, an optical sensor and/or a magnetic field sensor may be assigned to the ignition aid. A transformer-generated voltage or a voltage change in the components of the ignition aid under current load can also be used as a signal which indicates the tripping of the ignition aid.

The current flow in the path of the DC mains assigned to the surge arrester (also referred to as the "main path") allows conclusions to be drawn as to whether a relevant impulse or mains follow current needs to be handled at all or still has to be handled. This is of particular importance as surge arresters are used in the cross branch of the DC mains and therefore any current flow in the cross branch is usually to be classified as a residual current which, if it is high enough and long enough, may trip downstream means for system or personal protection and lead to unwanted mains interruptions.

To be able to reliably handle mains follow currents of low current intensity, a falling below the specified current threshold in the path of the DC mains assigned to the surge arrester after the specified duration can be used as a tripping condition.

In this respect, the at least two tripping conditions can be based on different parameters, which are in particular detected differently.

The surge arrester may comprise an optical sensor for detecting an arc in the spark gap, a current sensor for measuring current intensities in the DC mains and/or a voltage sensor, which is/are connected to the evaluation module in a signal-transmitting manner. An arc in the spark gap can therefore be detected by means of an optical sensor, a current intensity in the DC mains can be measured by means of a current sensor and/or a voltage can be measured by means of a voltage sensor, the optical sensor, the current sensor and/or the voltage sensor detecting at least one parameter, based on which the at least two tripping conditions are checked.

To further reduce the costs of the surge arrester, the optical sensor, the current sensor and/or the voltage sensor may be designed as a threshold value sensor.

The surge arrester can have at least one optical sensor to determine the occurrence, movement and/or burning duration of the arc. The optical sensor is set up to detect the light emitted by the arc so that the presence and position of the arc can be derived from a characteristic spectrum, for example.

In particular, the at least one optical sensor can be arranged in the extinguishing chamber, in the ignition area and/or in the running area of the spark gap designed as a horn spark gap.

It is also possible for the surge arrester to have optical components which are set up to guide the light emitted by the arc to the at least one optical sensor. In this way, the optical sensor can be positioned particularly flexibly, as it does not have to be installed directly at or near the location where the arc occurs. In particular, such a design allows the optical sensor to be positioned behind a diaphragm element so that the influence of interfering sources on the measurement performed by the optical sensor can be minimized.

Furthermore, the surge arrester may comprise at least one magnetic field sensor which is set up to detect and/or locate the arc via the magnetic field generated by the arc.

A current sensor may also be assigned to a component of the spark gap, wherein the current intensity detected by the current sensor can be used to draw conclusions about an arc and, in particular, the position thereof.

To detect that the arc has reached the extinguishing chamber, a probe for detecting partial currents of the arc may be present in the extinguishing chamber.

With regard to possibilities for evaluating the behavior of an arc, reference is also made to DE 10 2019 210 236 A1, DE 10 2019 210 234 B3, DE 10 2019 101 212 A1 and DE 10 2019 101 200 A1, in which the evaluation of the switching behavior of a spark gap is specified for the purpose of disconnecting the spark gap from the mains.

The specified current threshold is specified with regard to the respective design of the spark gap and the extinguishing aid. In particular, the specified current threshold is a current with the lowest current intensity which is reliably extinguished by the spark gap within the specified time duration. The current threshold thus determines the required minimum extinguishing capacity of the extinguishing aid.

In one variant, the specified current threshold is less than 100 A.

For example, the specified current threshold is in a range from 1 to 100 A. For mains follow currents with a current intensity of 100 A or more, the extinguishing capacity of conventional spark gaps increases sufficiently so that the extinguishing aid would have to be used increasingly less frequently.

The specified time duration depends in particular on the maximum time for which a current below the current threshold may flow through the spark gap before downstream devices for system or personal protection are tripped and/or downstream components of the DC mains are damaged. This may depend on the respective case of application or area of use.

In one variant, the specified time duration, which in particular specifies the target total switch-off time from the ignition of the spark gap to the switch-off of a possible mains follow current, is shorter than 10 ms.

For example, the specified time duration is in the range from 1 ms to 10 ms. The surge arrester according to the present disclosure makes it possible to reliably extinguish mains follow currents below the specified current threshold via the extinguishing aid, even with such short durations, without having to resort to uneconomically expensive components.

The extinguishing aid may be a hybrid circuit, a snubber circuit, a countercurrent circuit, an active resonant circuit and/or a passive resonant circuit.

To protect the spark gap and/or the extinguishing aid from damage due to uncontrollable currents, the surge arrester may have a backup protective device which is set up to disconnect the spark gap and/or the extinguishing aid from the DC mains if a current occurs in the path of the DC mains assigned to the surge arrester which would lead to damage to the spark gap and/or extinguishing aid. In this respect, the spark gap and/or the extinguishing aid can be disconnected from the DC mains if a current occurs in the path of the DC mains assigned to the surge arrester which would result in damage to the spark gap and/or the extinguishing aid.

The backup protective device can be tripped actively or passively.

For example, the backup protective device comprises a switch which is connected in series with the spark gap and is set up to disconnect the spark gap from the DC mains if a current occurs in the path of the DC mains assigned to the surge arrester which would damage the spark gap.

Furthermore, the backup protective device may have a short-circuiter which is connected in parallel with the extinguishing aid.

A further aspect provides that the evaluation module has a machine learning module which is set up to adapt the specified current threshold, the specified time duration and/ or the considered tripping conditions based on a training data set and/or a data set comprising information about mains follow currents handled by the surge arrester in the past. The operation of the surge arrester can thus be adapted during, in particular continuously. Ageing effects of the components used or changing influences can thus be taken into account or even compensated for. Overall, this ensures that the extinguishing aid is always activated as required.

Furthermore, parameters for the operation of the surge arrester can be adjusted continuously. The parameters may include, among others, tripping conditions, threshold values and/or delay times. The continuous adaptation can be based on the sensor value recorded by the at least one sensor or on estimates, in particular by means of a machine learning module. In this respect, a self-learning system can be stored which, among other things, continuously adapts algorithms for activating the extinguishing aid to thus ensure that the extinguishing aid is activated as required.

Information about the expected behavior of the spark gap may be taken into account to determine whether or not the spark gap alone can extinguish the mains follow current occurring in the DC mains within the specified time duration.

This information can be stored in the evaluation module. The recorded measurement data, in particular that from the at least one sensor, is used together with the stored information to determine whether or not the spark gap alone can extinguish the mains follow current occurring in the DC mains within the defined time duration. Depending thereon, the extinguishing aid is triggered or not, i.e. activated or left passive.

The extinguishing aid may be designed as a separate module which is connected in parallel with the spark gap or in series with the spark gap.

This enables a particularly flexible assignment of the extinguishing aid to a spark gap in the DC mains. In this way, already existing surge arresters can be flexibly retrofitted with the extinguishing aid or extended therewith if required.

In a further configuration, the separate module may comprise a parallel connection of a spark gap, in particular a gas tube arrester, and an extinguishing aid. Such a separate module can be easily connected in series with further current-limiting surge protective devices to upgrade the further current-limiting surge protective devices with regard to their direct current extinguishing capacity (also referred to as "DC extinguishing capacity"). In particular, this configuration makes it possible to improve the DC extinguishing capacity of the further current-limiting surge protective devices without having to modify them.

In one variant, the surge arrester comprises a plurality of series-connected spark gaps, a triggerable extinguishing aid being assigned to at least one of the spark gaps.

BRIEF DESCRIPTION OF THE DRAWINGS

Further features and properties of the invention will become apparent from the description below of exemplary embodiments which are not intended to be understood in a restrictive sense, and from the drawings, in which.

DETAILED DESCRIPTION OF THE DRAWINGS

Figure 1:
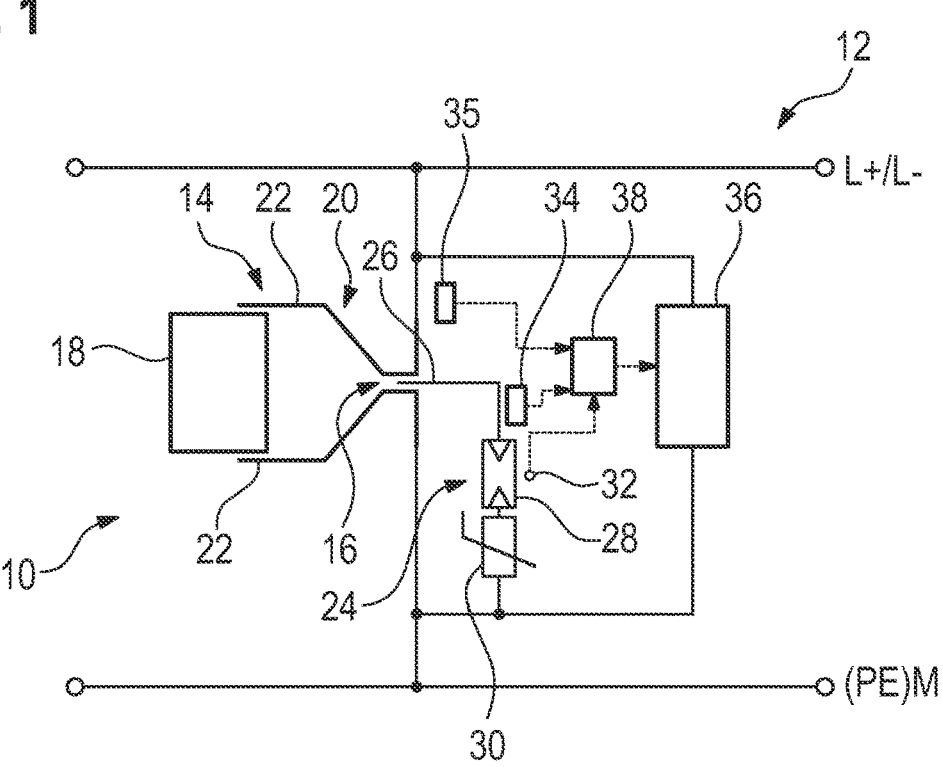
FIG. 1 is a schematic depiction of a first embodiment of a surge arrester according to the present disclosure.

FIG. 1 shows a first embodiment of a surge arrester 10 according to the present disclosure.

The surge arrester 10 is part of a DC mains 12 and is arranged in the cross branch between a first conductor ("L+/L−") and a second conductor ("(PE)M", i.e. the neutral or protective conductor) and is electrically connected thereto. The cross branch is also referred to as the "main path" below.

The surge arrester 10 comprises a spark gap 14, which is used to extinguish or at least limit mains follow currents occurring in the DC mains 12, the current intensity of which is equal to or greater than a specified current threshold. In addition, the spark gap 14 serves to conduct and (safely) discharge impulse currents occurring in the DC mains 12.

In the embodiment shown, the spark gap 14 is designed as a horn spark gap, which comprises an ignition area 16 for igniting an arc, an extinguishing chamber 18 spatially separated from the ignition area for extinguishing the arc, and a running area 20 arranged between the ignition area 16 and the extinguishing chamber 18. The running area 20 has running rails 22 along which the arc can travel and/or expand to reach the extinguishing chamber 18 and be extinguished therein.

It is to be understood that the spark gap 14 designed as a horn spark gap is merely exemplary and that any other types of spark gaps can also be used according to the present disclosure.

The spark gap 14 also has an ignition aid 24, which has an auxiliary ignition electrode 26, a gas tube arrester 28 and a varistor 30, which are connected in series.

The ignition aid 24 serves to lower the protection level of the spark gap 14.

An optical sensor 32, which is set up to detect an arc occurring within the gas tube arrester 28 is also assigned to the gas tube arrester 28.

Furthermore, a first current sensor 34 is assigned to the path of the ignition aid 24, which is set up to detect a current flow within the path of the ignition aid.

A second current sensor 35 is assigned to the main path, which, in contrast to the first current sensor 34, is set up to detect a current flow within the main path and thus allows a statement to be made about the current to which the spark gap 14 is directly exposed.

A triggerable extinguishing aid 36 is connected in parallel with the horn spark gap as a bypass of the spark gap 14 and is set up to extinguish mains follow currents below the specified current threshold. In other words, the extinguishing aid 36 is used to handle mains follow currents which cannot be extinguished with sufficient reliability by the spark gap 14 alone.

This does not exclude that the spark gap 14 cannot also extinguish currents having a current intensity below the specified current threshold. Rather, the extinguishing aid 36 serves to increase the reliability of the surge arrester 10 when extinguishing such currents.

The type of extinguishing aid 36 can be adapted to the respectively intended mode of operation of the surge arrester 10. For example, the extinguishing aid 36 is a hybrid circuit, a snubber circuit, a countercurrent circuit, an active resonant circuit and/or a passive resonant circuit. Furthermore, the extinguishing aid 36 can comprise a gas tube arrester or a spark gap.

The extinguishing aid 36 is in particular designed as a separate module which is connected in parallel with the spark gap 14.

In the case of a hybrid circuit and an active snubber circuit, when the extinguishing aid 36 is activated, a current path is connected which is at least temporarily of lower resistance in relation to the main path, i.e. the path assigned to the spark gap 14, so that a current flow from the main path commutates into the path of the extinguishing aid 36 and the arc in the assigned spark gap 14 is extinguished. The current in the low-resistance path of the extinguishing aid 36 is interrupted again after a certain time.

When using the countercurrent principle and in resonant circuits, at least one artificial zero crossing of the current in the spark gap 14 is induced, as a result of which the current in the DC mains 12 is extinguished.

Hybrid circuits (also referred to as "hybrid circuitries") are known, for example, from documents DE 10 2007 015 933 A1 and DE 10 2016 211 628 A1 and are generally based on a powerful semiconductor having low path resistance which is arranged in parallel with a switching contact or a spark gap. When the semiconductor is connected, the current from the switch or the spark gap path commutates to the semiconductor, which extinguishes any arcs that may be present. For commutation, it is necessary that the voltage drop during a current flow in the semiconductor is lower than the voltage required to maintain the arc discharge. The commutation time is influenced, among other things, by the ratio of the impedances and the coupling inductances between the semiconductor and the switch or spark gap. The switching gap only solidifies after commutation has been completed within a period of time which depends, among other things, on the load level, the isolating distance and the materials used. The semiconductor must carry the current until the switching gap has re-solidified to such an extent that the semiconductor can switch off the current and the isolation gap does not re-ignite due to the voltage occurring during switch-off. The duration for which the semiconductor is switched on can be time-controlled.

So-called "IGBTs" (abbreviation for "insulated-gate bipolar transistor") can be used as switch-off semiconductors. However, other controllable components can also be used, which can be switched off within the scope of the requirements. When switching off semiconductors, for example, very high switching voltages often occur in the DC mains 12 depending on the current to be switched and the mains conditions, which would lead to re-ignition of the spark gap 14 without further measures.

The hybrid circuit can therefore have various measures for limiting the overvoltage. Active limiting measures and passive measures can be used here. Common measures are the parallel connection of varistors, suppressor diodes and snubber circuits. If the semiconductor is sufficiently dimensioned, the overvoltage can be limited by avoiding a hard cut-off, but this significantly increases the power consumption of the semiconductor.

In the case of spark gaps, it is advantageous to provide the voltage for controlling the semiconductor from the arc voltage of the spark gap in accordance with document DE 10 2007 015 933 A1.

In the case of gas tube arresters with their very low arc drop voltages compared to other types of spark gaps, additional effort is required here, as the control voltage required for the semiconductor may be too high, especially if an IGBT is used as the semiconductor.

Alternatively, a MOSFET (abbreviation for "metal-oxide-semiconductor field-effect transistor") can be used in the hybrid circuit, especially if the path resistance of a comparably expensive IGBT becomes so high at the currents and voltages to be handled for the respective surge arrester 10 that reliable commutation in the path of the extinguishing aid 36 can no longer be ensured.

The extinguishing aid 36 is connected to an evaluation module 38 in a signal-transmitting manner so that the extinguishing aid 36 can be triggered by the evaluation module 38.

According to the present disclosure, the evaluation module 38 is set up to trigger the extinguishing aid 36 only if at least two tripping conditions are fulfilled which are characteristic of the fact that the spark gap 14 alone cannot extinguish the mains follow current within a specified time duration.

For this purpose, the evaluation module 38 can make use of the sensor data received from the optical sensor 32 and the current sensors 34 and 35, so that the evaluation module 38 detects whether, when, how long and/or at what level a current flows through the main path or through the path of the ignition aid 24, and whether, when and/or for how long an arc occurs in the gas tube arrester 28. It will be understood that if other types or sensor arrangements are used than those shown in FIG. 1, the evaluation module 38 can appropriately make use of sensor data obtained from these sensors.

In addition, information about the expected behavior of the spark gap 14 can be stored in the evaluation module 38, which makes it possible to determine from the collected measurement data whether an occurring mains follow current can be extinguished by the spark gap 14 alone or whether the extinguishing aid 36 must be activated.

The evaluation module 38 can comprise an analog circuit or a microprocessor.

The specified current threshold is less than 100 A, for example. At such current levels, the running behavior of arcs in conventional horn spark gaps is limited, so that it cannot always be assumed that a mains follow current below this current threshold will be extinguished by the spark gap 14, or at least not within the specified time duration.

The specified time duration or the total switch-off time is shorter than 10 ms, for example.

It is understood that the specified current threshold and the specified time duration must be adapted to the spark gap 14 and extinguishing aid 36 respectively used and that values other than those mentioned above are also possible. However, the surge arrester 10 according to the present disclosure allows the tripping conditions considered by the evaluation module 38 to be adapted flexibly and precisely to the respective components of the surge arrester 10, so that mains follow currents occurring in the DC mains 12 can be reliably extinguished.

Further embodiments of the surge arrester 10 according to the present disclosure are described in more detail below, only differences to the first or previous embodiments being respectively discussed. Identical reference numerals indicate identical or functionally identical components, and reference is made to the explanations as to the respective embodiments already described previously. It is understood that the elements of the various embodiments can be combined with each other as desired, provided that such a combination does not conflict with the described mode of operation of the surge arrester 10.

Figure 2:
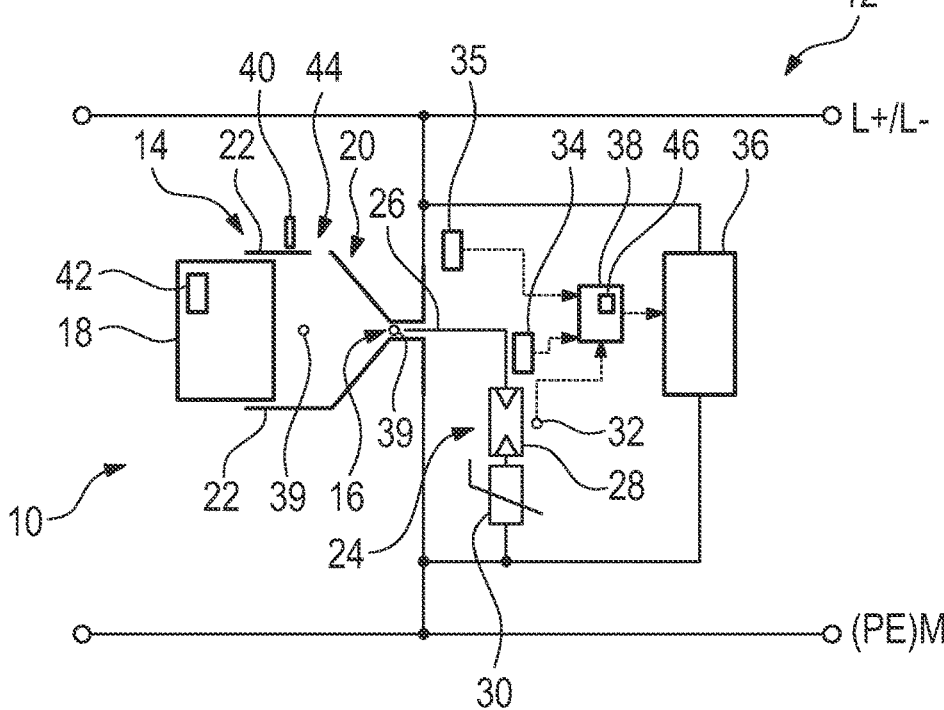
FIG. 2 is a schematic depiction of a second embodiment of a surge arrester according to the present disclosure.

FIG. 2 shows a second embodiment of the surge arrester 10 according to the present disclosure.

In the second embodiment, further means are exemplarily assigned to the spark gap 14 to determine the occurrence and behavior of an arc in the horn spark gap.

For this purpose, the spark gap 14 has two optical sensors 39, a magnetic field sensor 40 and a probe 42 assigned to the extinguishing chamber 18 for detecting partial currents of the arc in the extinguishing chamber 18. In other words, measurement data from one or more of the sensors can be used to evaluate the arc behavior.

One of the optical sensors 39 is assigned to the ignition area 16, so that this optical sensor can in particular provide information as to whether an arc occurs at all and whether it leaves the ignition area 16 or remains therein.

Another of the optical sensors 39 is assigned to the running area 20 and in particular provides information as to the position, movement and expansion of the arc.

The magnetic field sensor 40 is set up to detect the magnetic field caused by the arc and in this way also provides information about the behavior of the arc.

The probe 42 can be used to detect whether and when the arc has reached the extinguishing chamber 18.

In a particularly simple embodiment, the probe 42 can be designed to detect the potential or potential differences. The probe 42 can also be designed such that a partial arc can form within the extinguishing chamber 18 to the probe 42, the probe 42 being set up to determine the current intensity of the current flowing via the partial arc.

In the second embodiment, one of the running rails 22 furthermore has an interruption 44, which further simplifies the determination of the position of the arc, since a current flow or a potential in the part of the running rail 22 which is located behind the interruption 44 on the path to the extinguishing chamber 18 can only be expected after the arc has moved into this part, as a result of which this current flow or this potential can be (easily) detected with corresponding sensors.

In addition, the evaluation module 38 in the second embodiment has a machine learning module 46, the function of which will be discussed in more detail later.

It is understood that various types of sensors or probes and combinations thereof can be used to evaluate the ignition, the movement of the arc in the spark gap 14 and thus the mode of operation thereof. Among others, optical sensors, magnetic field sensors, current and/or voltage sensors can be used for this purpose, which can also be arranged differently than described in connection with FIG. 2.

Depending on the use of sensors in the circuit assigned to the ignition aid 24 or in the main circuit, the required number of sensors can also be limited to one or two sensors, the effort required to obtain information about the arc movement within the spark gap 14 being thus low.

The mode of operation of the surge arrester 10 according to the second embodiment is described in more detail below based on the flow diagram shown in FIG. 3.

Figure 3:
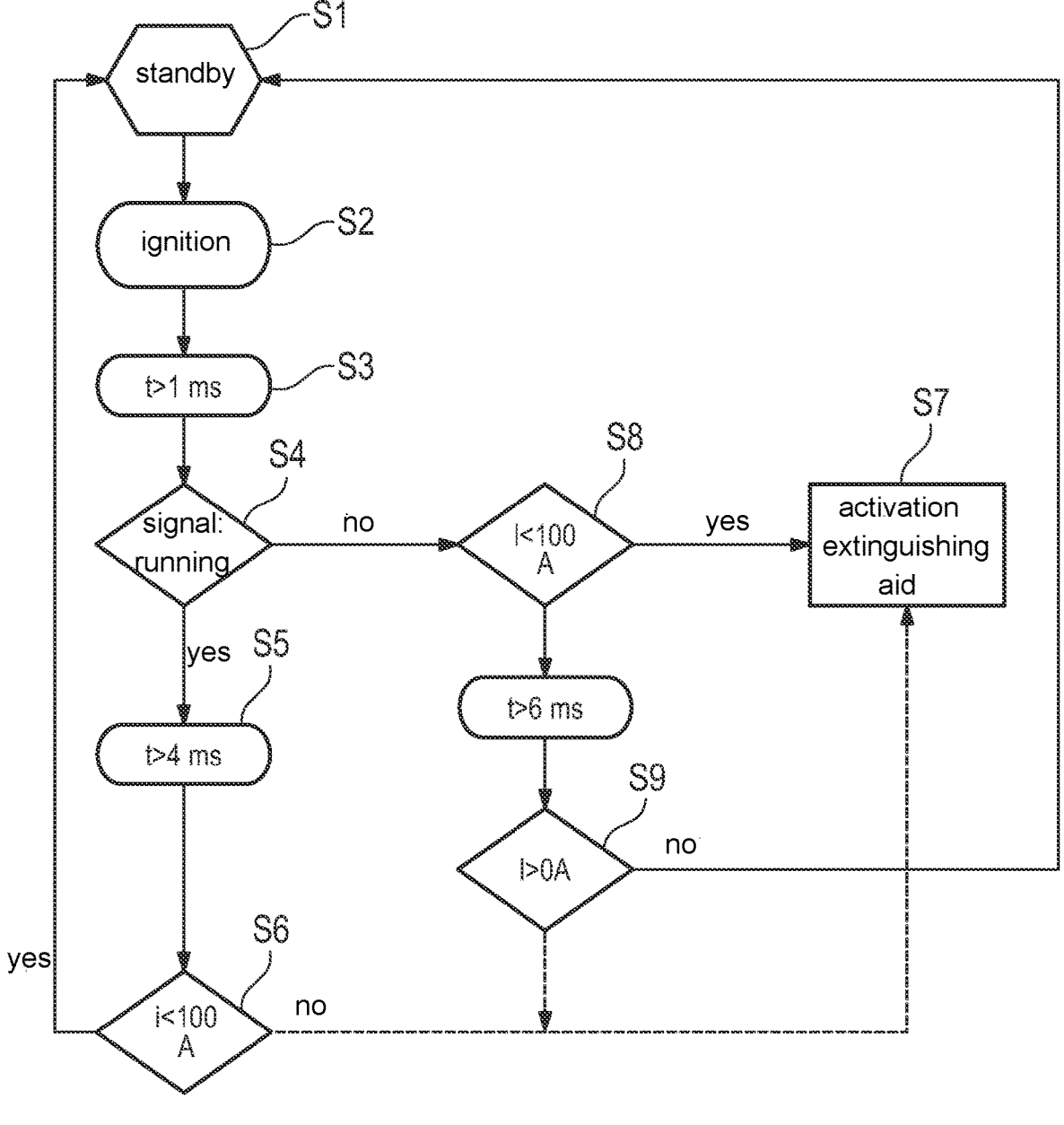
FIG. 3 is a flow diagram of the operation of the surge arrester of FIG. 2.

During normal operation of the DC mains 12, the surge arrester 10 according to the present disclosure is in standby mode (see step S1 in FIG. 3).

If a sufficiently high overvoltage occurs in the DC mains 12, a current flow is introduced into the spark gap 14 via the ignition aid 24 and the auxiliary ignition electrode 26. As a result of the impulse or mains follow current, an arc can be ignited in the ignition area 16 (see step S2 in FIG. 3).

The further steps shown serve to evaluate whether the ignited arc can enter the extinguishing chamber 18 to be extinguished there, or whether the extinguishing aid 36 must be activated.

First, a first delay time of 1 ms is waited for before the behavior of the ignited arc is evaluated (see step S3 in FIG. 3). In this way, it is avoided that the extinguishing aid 36 is unnecessarily switched on directly, although the spark gap 14 alone can handle the occurring mains follow current.

The evaluation module 38 is then used to evaluate the running behavior of the arc (see step S4 in FIG. 3). For this purpose, the evaluation module 38 can access all the information from the sensors of the surge arrester 10, i.e. in particular the information from the optical sensors 32 and 39, the current sensors 34 and 35, the magnetic field sensor 40 and the probe 42.

If it is determined that the arc at least begins to run, i.e. to move from the ignition area 16 in the direction of the extinguishing chamber 18, a second delay time of 4 ms is waited for (see step S5 in FIG. 3). The second delay time is selected so as to correspond to a normal extinguishing time of the spark gap 14, in which it safely discharges impulse currents and usually extinguishes mains follow currents above the specified current threshold or at least limits them to a level at which downstream devices for personal and system protection (not shown) in the DC mains 12 are not tripped. During the second delay time, the extinguishing aid 36 is not switched on so that the components thereof are not exposed to the instantaneous impulse or mains follow current.

After the second delay time has elapsed, the level of the current flowing via the main path is evaluated, i.e. the current flowing via the spark gap 14 (see step S6 in FIG. 3).

If this current has a current intensity below the specified current threshold, i.e. below 100 A in the present case, it is assumed that the already running arc is limited to a sufficient extent and in a sufficient time by the spark gap 14 alone, and the extinguishing aid 36 is not activated. The surge arrester 10 therefore goes back into standby mode.

However, if the current is above the current threshold after the second delay time, it is assumed that the spark gap alone cannot handle the occurring mains follow current to a sufficient extent within the specified time duration (in the present case within 10 ms or less), and the extinguishing aid 36 can additionally be activated (see step S7) in FIG. 3.

This procedure can eliminate or at least reduce the risk of false tripping of the extinguishing aid 36.

If the evaluation module 38 has already determined that the ignited arc has not at least started to run, an evaluation of the current flowing via the main path takes place immediately, i.e. without waiting for the second delay time (see step S8 in FIG. 3).

If it is determined that the mains follow current is already below the specified current threshold at this time, the extinguishing aid 36 is activated immediately (see step S7 in FIG. 3) to limit the mains follow current as quickly and safely as possible within the specified time duration.

If the current intensity is above the specified current threshold, the extinguishing aid 36 is not immediately activated to protect the components of the extinguishing aid 36 from a potential load with excessive currents. Instead, a third delay time of 6 ms is first waited for and then the sensors are used to evaluate whether a current is still flowing via the main path after the third delay time, for example using the current sensor 35 and/or the optical sensors 39 (see step S9 in FIG. 3). In other words, it is checked whether the spark gap 14 alone has in the meantime already extinguished the arc within the third delay time.

If this is the case, the surge arrester 10 returns to standby mode. However, if a current flowing via the main path is still detected, the extinguishing aid 36 can also be activated to support the spark gap 14 and thus try to ensure that the mains follow current can still be extinguished within the specified time duration.

The extent to which the activation of the extinguishing aid 36 should take place or rather be avoided when a current level greater than the specified current threshold is detected after step S6 or S9 depends on the design of the overload capacity of the spark gap 14, the extinguishing aid 36 and optionally existing further internal and external protective measures.

It follows from the sequence described above that the first delay time, the second delay time and the third delay time as well as the sum of the first delay time and the second delay time must be selected to be shorter than the specified time duration.

However, it is understood that the specified current threshold, the specified time duration and the first to third delay times can be adjusted as required.

Accordingly, the evaluation module 38 is set up to adapt the tripping conditions, the threshold values and/or the delay times used for the operation of the surge arrester 10, in particular based on mains follow currents handled by the surge arrester 10 in the past, which are stored in the form of a data set in the evaluation module 38.

For this purpose, the evaluation module 38 can access the machine learning module 46, which is set up to adapt the respective parameters based on the data set. In this way, it is possible to adapt the mode of operation of the surge arrester 10 to the real conditions of the DC mains 12 at the installation location of the surge arrester 10 and over the service life thereof. In other words, the machine learning module 46 ensures that continuous adaptation takes place.

Particularly advantageously, it is checked in this way whether the specified time duration can be shortened and/or whether the extinguishing aid 36 is reliably switched on only when absolutely necessary.

In particular, the adaptation takes place automatically so that the intervention of a user can be dispensed with.

It should be understood that the flow chart shown in FIG. 3 is merely an example of the tripping conditions and criteria used. These can of course be adapted to the specific design of the spark gap 14, the ignition aid 24, the extinguishing aid 36 and the sensors available and under consideration. For example, in addition to the delay times, the specified time duration and the specified current threshold, the evaluation module 38 can also make use of energies, gradients, charges, impedances or other variables which characterize the behavior of the surge arrester 10.

It is also possible to use additional measured variables which are based on the extinguishing aid 36, for example the current intensity or the gradient thereof of a current flowing via the extinguishing aid 36.

Information can be obtained from the increase in current intensity through the spark gap 14 as to the extent to which current limitation has already taken place or the current is still increasing. This information can be used to draw conclusions about the extent to which it makes sense to switch on the extinguishing aid 36 prematurely or whether there is a risk of overload if it is switched on due to the increase in current.

Figure 4:
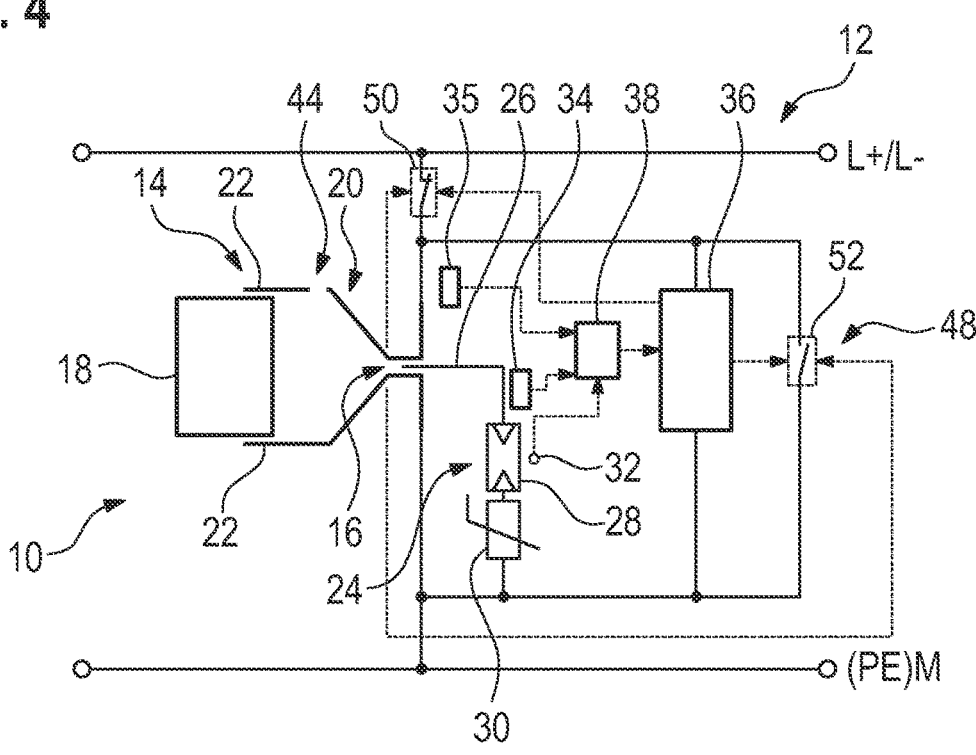
FIG. 4 is a schematic depiction of a third embodiment of a surge arrester according to the present disclosure.

FIG. 4 shows a third embodiment, which is substantially analogous to the first embodiment.

However, the surge arrester 10 also has a backup protective device 48, which has a switching element 50 and an activatable short-circuiter 52. It is also possible to provide only the switching element 50.

The switching element 50 can be activated at least once and serves as a switch or fuse to safely disconnect the spark gap 14 from the remaining DC mains 12, if necessary.

Basically, it is also possible for the switching element 50 to be a passive switching element which can be triggered, for example, on the basis of a time-current characteristic or a short-circuit switching.

The short-circuiter 52 is connected in parallel with the extinguishing aid 36 and is used to discharge currents past the spark gap 14 and the extinguishing aid 36 when the short-circuiter 52 is activated.

The switching element 50 and the short-circuiter 52 are connected to the evaluation module 38 and the extinguishing aid 36 in a signal-transmitting manner and can be tripped both by the evaluation module 38 and by the extinguishing aid 36.

It is also possible that the switching element 50 and/or the short-circuiter 52 are set up to be tripped by further devices of the spark gap 14, which can react, for example, to wear, heating, pressure and/or melt integrals.

Figure 5:
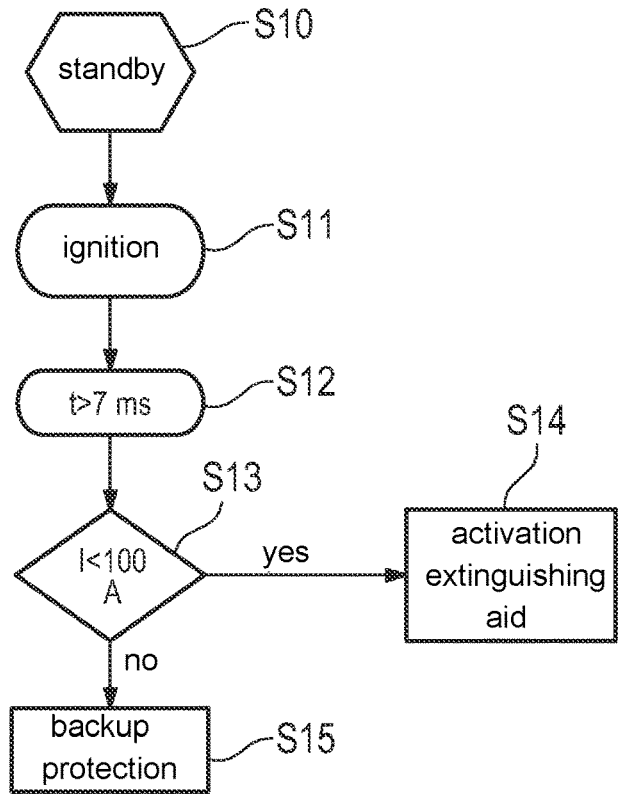
FIG. 5 is a schematic depiction of a flow diagram of the operation of the surge arrester of FIG. 4.

Alternatively or additionally, the switching element 50 and/or the short-circuiter 52 can be tripped if there is a risk of overloading the extinguishing aid FIG. 5 shows a flow diagram which describes a possible mode of operation of the surge arrester 10 according to the third embodiment.

During normal operation of the DC mains 12, the surge arrester 10 according to the present disclosure is in standby mode (see step S10 in FIG. 5).

If a sufficiently high overvoltage occurs in the DC mains 12, which trips the spark gap 14, an arc is ignited in the ignition area 16 (see step S11 in FIG. 5). This can be detected by the fact that a current flows via the path of the ignition aid 24, as can be determined via the current sensor 34.

The further steps shown serve to evaluate whether the ignited arc can enter the extinguishing chamber 18 to be extinguished there, whether the extinguishing aid 36 must be activated or whether the backup protective device 48 must be activated.

First, a first delay time of 7 ms is waited for before the current flowing via the main path is measured by the current sensor 35 and evaluated in the evaluation module 38 (see steps S12 and S13 in FIG. 5).

The first delay time is selected so as to correspond to a time duration in which the spark gap 14 should be able to reliably limit or extinguish any mains follow currents above the specified current threshold, in this case 100 A.

If it is determined that the current flowing via the main path is below the specified current threshold after the first delay time, the extinguishing aid 36 is activated to reliably extinguish the mains follow current occurring within the specified time duration (see step S14 in FIG. 5).

However, if the current flowing via the main path has a current intensity above the current threshold even after the first delay time, the backup protective device 48 (see step S15 in FIG. 5), i.e. the switching element 50 and/or the short-circuiter 52 is tripped.

It is understood that after step S12—if no current is flowing—the surge arrester is automatically reset to standby mode according to step S10 (not explicitly shown in FIG. 5).

Figure 6:
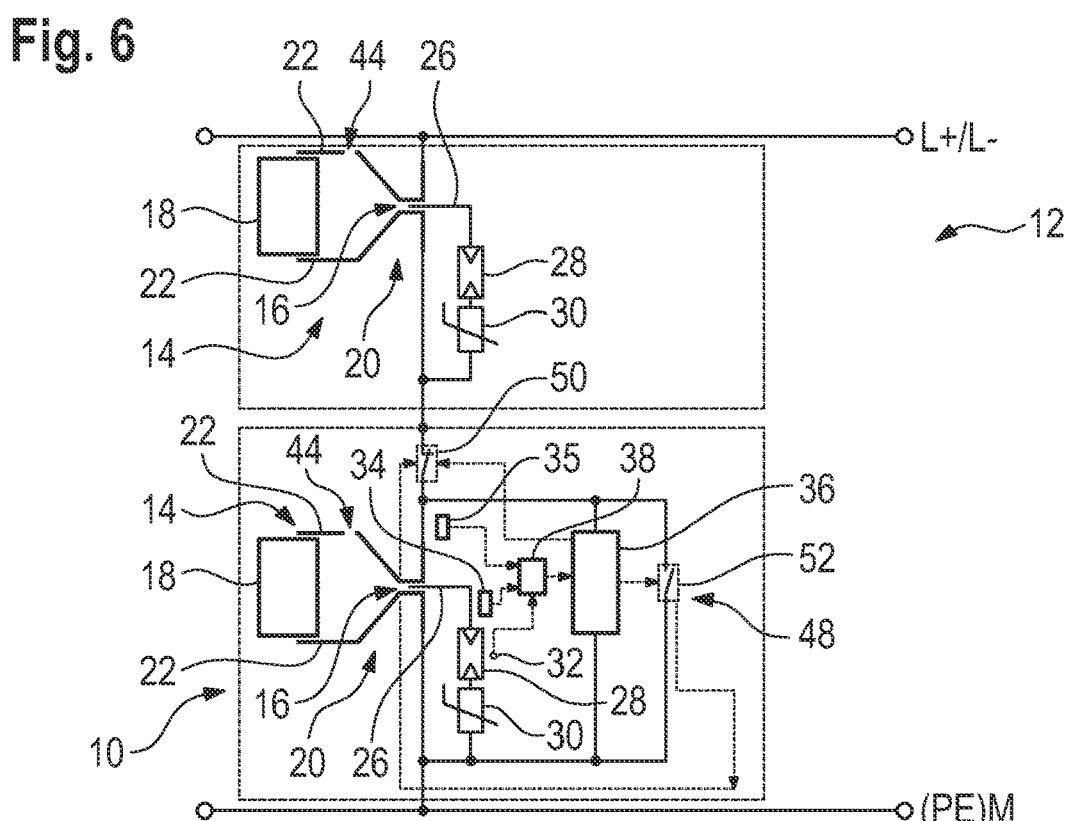
FIG. 6 is a schematic depiction of a fourth embodiment of a surge arrester according to the present disclosure.

FIG. 6 shows a fourth embodiment of the surge arrester 10 according to the present disclosure, which has a plurality of series-connected spark gaps 14, the extinguishing aid 36 being connected in parallel with one of the spark gaps 14 as a bypass.

The extinguishing aid 36 is preferably assigned to the spark gap 14 close to earth, i.e. the spark gap 14 which is arranged closest to the second conductor ("(PE)M") in terms of circuitry.

In the embodiment shown, all of the spark gaps 14 are horn spark gaps as described above. However, it is understood that any combination of types of spark gaps 14 can also be used.

The use of several spark gaps 14 in the surge arrester 10 serves to be able to control even higher voltages and/or to further improve the performance for extinguishing mains follow currents. In such configuration, it is however sufficient to provide only one of the series-connected spark gaps 14 with the extinguishing aid 36, since all partial arcs occurring in the spark gaps 14 are extinguished as soon as the extinguishing aid 36 trips.

An advantage of this embodiment over the previously presented embodiments is that the extinguishing aid 36 is not permanently connected directly to the DC mains 12. This is only the case as soon as at least the other spark gap 14 trips and thus only when the overall arrangement of the surge arrester 10 is activated. In this way, components can be used in the extinguishing aid 36 which must be able to withstand lower requirements or loads than would be the case with a direct connection to the DC mains 12.

Figure 7:
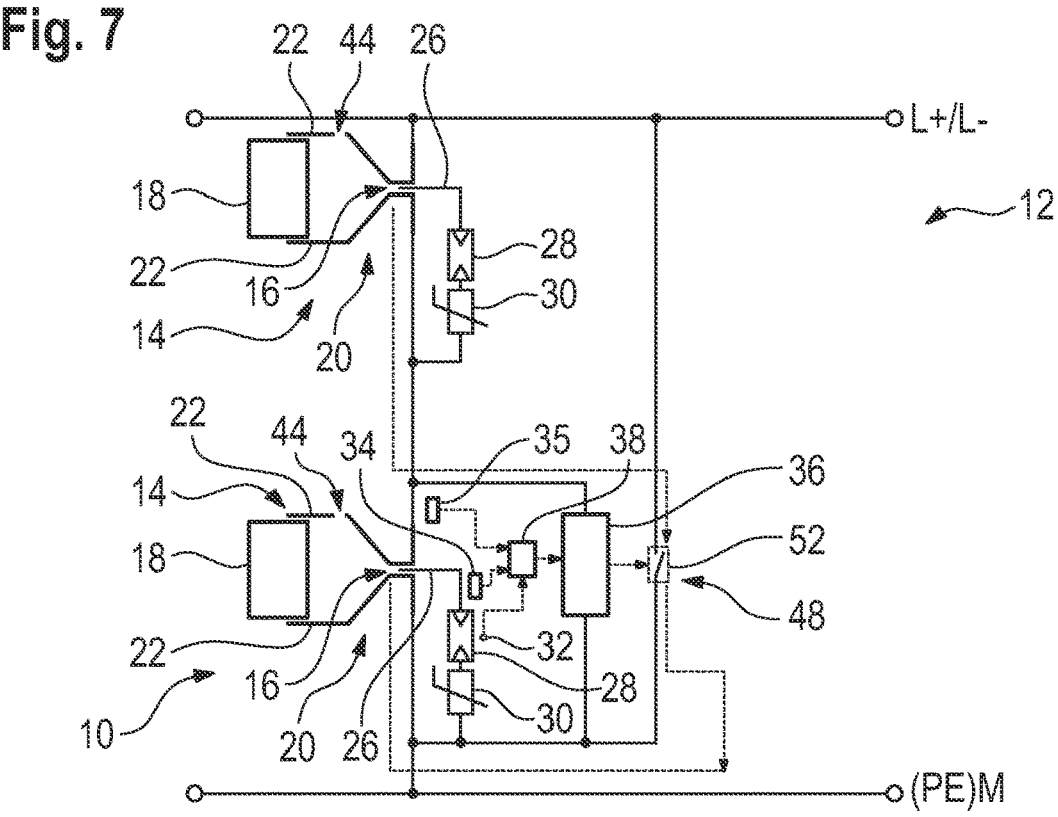
FIG. 7 is a schematic depiction of a fifth embodiment of a surge arrester according to the present disclosure.

FIG. 7 shows a fifth embodiment of the surge arrester 10 according to the present disclosure, which substantially corresponds to the embodiment shown in FIG. 6.

However, in the fifth embodiment, the backup protective device 48 has no switching element 50 and the triggerable short-circuiter 52 is directly electrically connected to the phase conductors of the DC mains, so that all spark gaps 14 of the surge arrester 10 are bridged by the short-circuiter 52 as soon as it trips.

In this embodiment, the short-circuiter 52 can be adapted to be tripped in particular on the basis of information about the behavior of one or more of the spark gaps 14 and/or the extinguishing aid 36.

The configuration of the surge arrester 10 shown in FIG. 7 is particularly sufficient if disconnection of the surge arrester 10 is additionally ensured via an overcurrent protection element (not shown) arranged upstream of the surge arrester 10.

Figure 8:
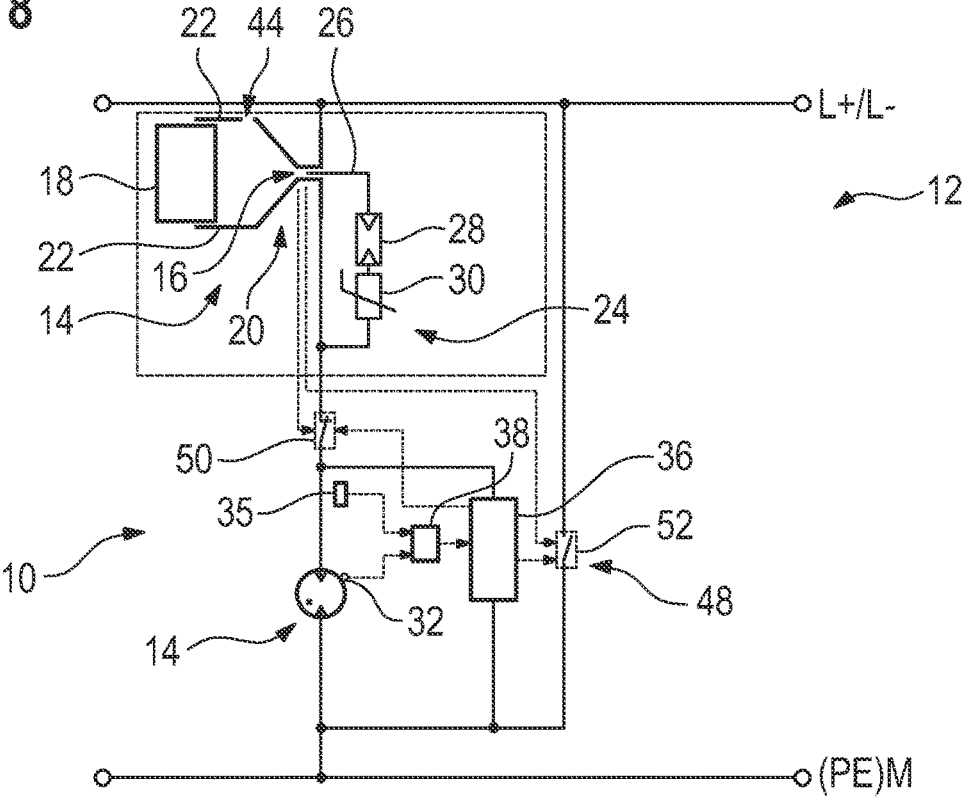
FIG. 8 is a schematic depiction of a sixth embodiment of a surge arrester according to the present disclosure.

FIG. 8 shows a sixth embodiment of the surge arrester 10 according to the present disclosure, which substantially corresponds to the embodiment of FIG. 7.

However, the spark gap 14 to which the extinguishing aid 36 is assigned as a bypass is not a horn spark gap, but a gas tube arrester. In other words, the surge arrester 10 comprises a plurality of differently designed spark gaps 14.

In this way, an optimum compromise can be achieved between the complexity and costs of the components involved on the one hand and a sufficient level of protection on the other hand.

As can be seen in FIG. 8, an optical sensor 32 is assigned to the gas tube arrester, by means of which it can be determined whether an arc is formed inside the gas tube arrester and, if so, for how long.

In this embodiment, the evaluation module 38 can thus use the occurrence and/or the burning duration of an arc in the gas tube arrester, a current flow in the main path and an exceeding of or a falling below a current threshold in the main path as tripping conditions for the extinguishing aid 36.

Figure 9:
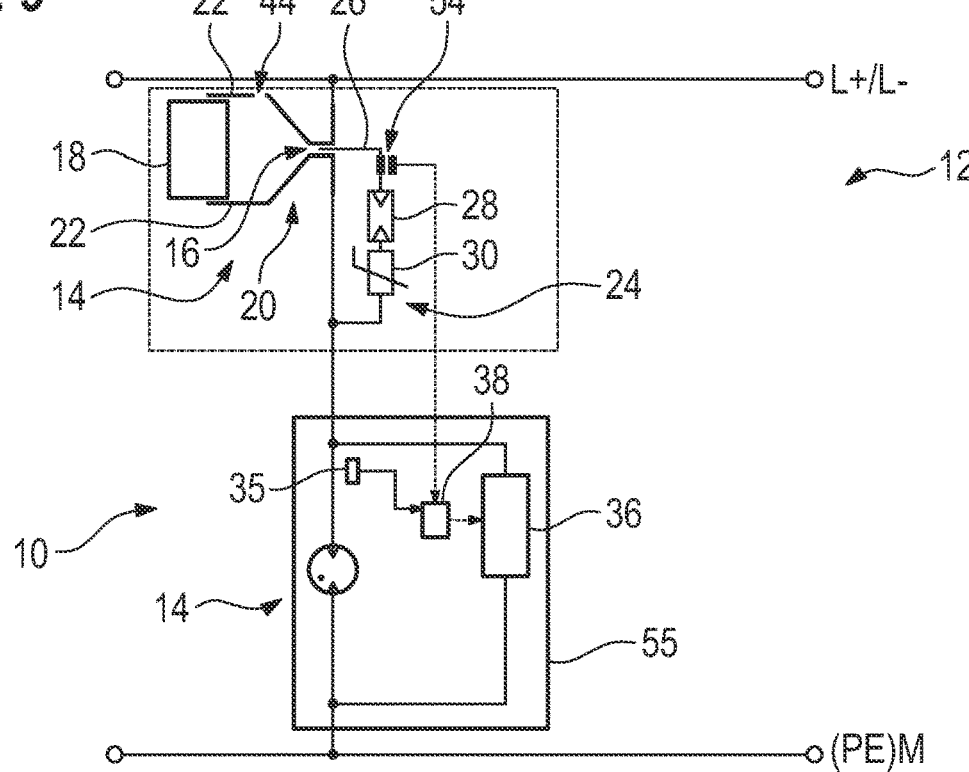
FIG. 9 is a schematic depiction of seventh embodiment of a surge arrester according to the present disclosure.

FIG. 9 shows a seventh embodiment of the surge arrester 10, which is characterized by a particularly simple design.

Like the sixth embodiment, the seventh embodiment has a plurality of spark gaps 14, one of the spark gaps 14 being designed as a horn spark gap with an ignition aid 24 and the other spark gap 14 being designed as a gas tube arrester. The extinguishing aid 36 is assigned to the gas tube arrester in the bypass. However, in this embodiment, the gas tube arrester is not monitored by an optical sensor.

Instead, as shown here, a threshold value transmitter 54 can be arranged in the path of the ignition aid 24, which can indicate the activation of the ignition aid, for example when an auxiliary ignition current threshold is exceeded or undershot. Basically, the threshold value transmitter 54 can also work on the basis of the detection of a magnetic field. In a particularly simple embodiment, the threshold value transmitter 54 can be a reed contact.

A current sensor 35 is also present, which is assigned to the main path and can also be designed as a simple threshold value sensor.

If the behavior of the intact spark gaps 14 is known, it is thus possible to conclude whether the extinguishing aid 36 must be switched on or not purely on the basis of an exceeding of or falling below specified current thresholds, possibly also only on the basis of a single sensor in the main path.

In particular, only the ignition of the spark gap 14 and the current falling below the specified current threshold after a first waiting time are required as tripping conditions in this embodiment.

However, the first waiting time must be selected sufficiently long, as a minimum threshold value of the current intensity may be undershot several times during the extinguishing process of a mains follow current.

The arrangement of FIG. 9 also makes it possible to shorten the total time for extinguishing mains follow currents without having to use information about the running behavior of the arc in the horn spark gap, since even if the extinguishing aid 36 is switched on although there is still an arc through the horn spark gap, the current acting on the extinguishing aid 36 is at least limited and the extinguishing function of the extinguishing chamber 18 is not impaired or even supported by the extinguishing aid 36.

In principle, it is also possible to completely dispense with the consideration of the current intensity when determining the tripping conditions. In this case, only the time at which an arc occurs and the elapse of the specified time duration would be used as tripping conditions. The extinguishing aid 36 would thus inevitably be triggered as soon as the specified time duration has elapsed after ignition of the arc. Such a solution can be useful if it is ensured that a fault current in the DC mains 12 is not subsequently fed into the extinguishing aid 36. This can be achieved by selecting the first delay time and/or the specified time duration sufficiently long so that occurring impulse currents are (safely) discharged and mains follow currents which could damage the extinguishing aid 36 are reliably limited or extinguished within this time period or if, as shown in FIGS. 6 to 9, the extinguishing aid 36 does not form a bypass for the entirety of all spark gaps 14, as is the case, for example, for the embodiments according to FIGS. 1, 2 and 4.

In the embodiments according to FIGS. 1, 2 and 4, the extinguishing aid 36 is loaded with the prospective mains follow current during activation. On the one hand, this may require additional measures to prevent incorrect activation, possibly also protection against overloading the extinguishing aid 36, and on the other hand, premature activation may also disrupt the extinguishing function of the spark gap 14, which may even increase the load on the spark gap 14.

If spark gaps 14 are connected in series, the influence of the activation of the extinguishing aid 36 on the extinguishing of high currents by the spark gap 14 is reduced. In addition, the risk of overloading the extinguishing aid 36 can be reduced.

In particular, an overload protection of the extinguishing aid 36 can be provided, which ensures a reversible overload cut-off.

In the embodiments according to FIGS. 8 and 9, the mains follow current limitation is realized almost exclusively by the spark gap 14 with the extinguishing chamber 18, i.e. not by the spark gap 14 with the gas tube arrester and the extinguishing aid 36. Incorrect activation of the extinguishing aid 36 can therefore not lead to an impairment of the extinguishing capacity at high currents. As a result, the effort with regard to the number and/or type of sensors used, as described above, and with regard to the evaluation of the measurement data collected by the sensors can be reduced. At the same time, it is possible to achieve a high degree of flexibility in the time control of the behavior of the surge arrester 10 with little additional effort on the part of the components used, which in particular makes it possible to shorten the overall shutdown time.

It is also possible for the extinguishing aid 36 to have an integrated monitoring function which is set up to automatically switch off the extinguishing aid 36 if currents and/or current gradients occur which would exceed the extinguishing capability of the surge arrester 10, i.e. an extinguishing capability threshold value of the surge arrester 10.

This is possible in particular without significant additional effort if a semiconductor such as an IGBT or a MOSFET is used in the extinguishing aid 36.

In this configuration, the evaluation module 38 can be set up to carry out the temporarily next extinguishing attempt in an adapted manner after automatic deactivation of the extinguishing aid 36, for example by means of an adapted flow pattern for tripping the extinguishing aid 36. For example, the tripping of the extinguishing aid 36 in the temporarily next extinguishing attempt can be carried out exclusively on the basis of time intervals, in particular with shorter time intervals than before.

The arrangement of the gas tube arrester and the parallel extinguishing aid 36 described in FIGS. 8 and 9 can, as described above, also be operated without sensors inserted directly into the upstream spark gap 14. This makes it easier to operate the surge arrester 10 in series with other follow current-limiting arresters or spark gaps.

FIG. 9 also schematically indicates that the current sensor 35, the extinguishing aid 36, the evaluation module 38 and one of the spark gaps 14, designed here as a gas tube arrester, are components of a separate module 55.

For example, the components of the separate module 55 are accommodated in a separate housing (not shown), which is possible in particular due to the comparatively simple sensor technology as used in the embodiment according to FIG. 9.

In conventional surge arresters 10 or spark gaps 14, such separate modules 55 can be connected in series as required to enhance the DC extinguishing capacity.

The cooperation with these devices can be easily taken into account due to the short switch-off time of the separate module 55 with the extinguishing aid 36 after the activation thereof in the nominal range of <1 ms during mains operation. This makes it possible to operate current-limiting surge protective devices actually designed for AC systems in DC mains over a wide range of applications.

In addition to the use of horn spark gaps for mains follow current limitation, stacked spark gaps, a series connection of several gas tube arresters or so-called Radax flow spark gaps can also be used, which limit the current by means of flow and pressure build-up. Furthermore, a series connection with varistors or suppressor diodes is also possible. A series connection with combinations of these current-limiting devices as spark gaps 14 is also possible.

Such a combination is particularly advantageous if the surge arrester 10 is used in mains which are temporarily operated with voltages higher than the nominal voltage, as in this case the current limitation designed for the nominal voltage is not sufficient when it responds. Such an arrangement is also advantageous to counteract ageing effects of the individual components of the surge arrester 10 and/or if components of the surge arrester 10 are already undersized for the operating voltage to achieve low protection levels.

Figures 10, 11:
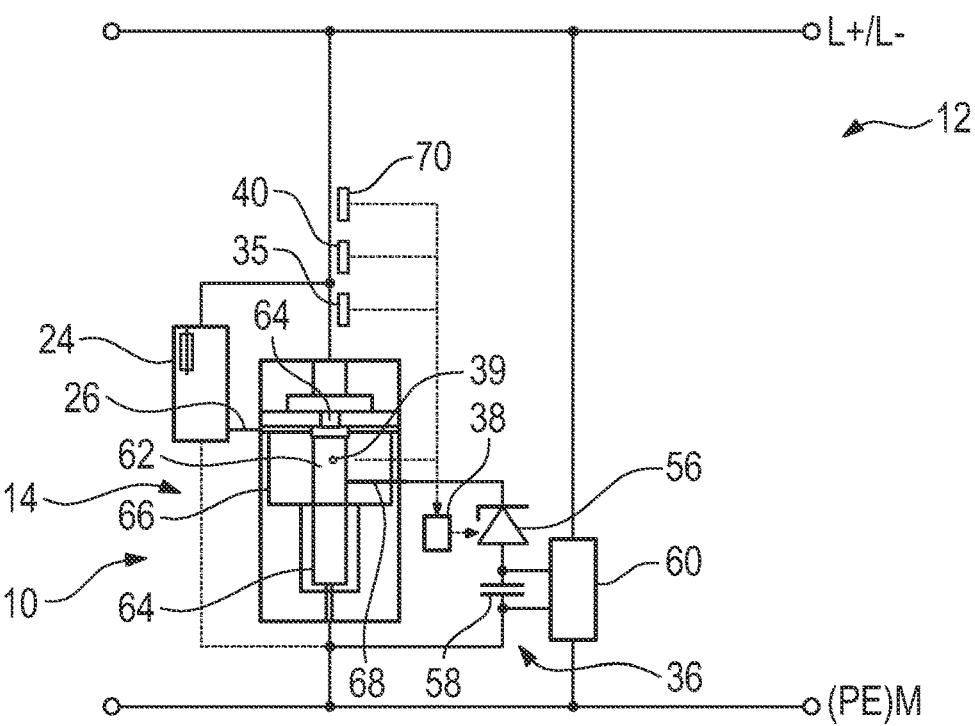
FIG. 10 is a schematic depiction of an eighth embodiment of a surge arrester according to the present disclosure.
FIG. 11 is a schematic depiction of a ninth embodiment of a surge arrester according to the present disclosure.

FIG. 10 shows an eighth embodiment of the surge arrester 10 according to the present disclosure.

In the eighth embodiment, the surge arrester 10 again comprises a plurality of spark gaps 14, one of which is designed as a horn spark gap and the other as a gas tube arrester, the evaluation module 38 and the extinguishing aid 36 being connected in parallel with and assigned to the gas tube arrester.

In this exemplary embodiment, the extinguishing aid 36 is a combination of a snubber circuit and a countercurrent circuit and has a semiconductor switching element 56 and a capacitor 58.

The semiconductor switching element 56 is designed as a thyristor.

The capacitor 58 is connected to a charging circuit 60, which is connected to the conductors of the DC mains 12 and is set up to charge the capacitor 58.

The surge arrester 10 also has a magnetic field sensor 40, which can be a reed sensor, for example, and is set up to put the evaluation module 38 on standby if the gas tube arrester ignites.

The current sensor 35 assigned to the main path is set up to detect an undershot of the current threshold in the main path and to transmit this information to the evaluation module 38.

It is understood that a different number of sensors, other types of sensors and/or sensor arrangements can also be used to monitor the current flow in the main path.

Information about the expected extinguishing behavior of the gas tube arrester is stored in the evaluation module 38, which in the simplest case only comprises a predetermined sequence and a time interval of the signals received from the magnetic field sensor 40 and/or the current sensor 35.

Based on this information as tripping conditions, the evaluation module 38 is set up to control the semiconductor switching element 56 when a current flows through the main path with a current intensity below the specified current threshold.

This results in the capacitor 58 being discharged via the semiconductor switching element 56 and the gas tube arrester. According to the present disclosure, the capacitor 58 has previously been charged by the charging circuit 60 such that the discharge current has an opposite direction to the current across the gas tube arrester, which has not yet been interrupted.

Thus, a zero crossing of the current is generally forced in the gas tube arrester, i.e. the spark gap 14, by the countercurrent, as a result of which the current in the series-connected spark gaps 14 is extinguished as a whole. To this end, the current level of the countercurrent must be at least equal to the amount of the instantaneous value of the current through the gas tube arrester.

In the proposed application of this extinguishing aid 36, the effort required to generate the countercurrent is significantly lower for small or already severely limited mains follow currents with a current intensity of substantially 100 A than for the prospective currents of the mains, which can have a current intensity in the range of several 10 kA.

In addition to a simple discharge of a capacitor, the countercurrent can also be generated using other known principles, for example in a transformer-based or pulsed manner.

If a resonant circuit (also referred to as a "tuned circuit") is to be used as an extinguishing aid 36, it is possible to replace the capacitor 58 in the configuration shown in FIG. 10 with a so-called RLC element (resistance-inductance-capacitor), wherein a current flow in both directions must be possible due to oscillations.

In contrast to the countercurrent principle, the charging of a capacitor can also be used to extinguish the arc, for example with low currents. In this case, the capacitor is switched on, for example by a semiconductor, when at least two tripping conditions are reached.

As an alternative to switches with switch-on and switch-off capacity, inexpensive semiconductors with lower path resistances can be used for active snubber circuits, which can also be controlled with low voltages. In this case, it is also possible to implement an extinguishing aid 36 without active switch-off behavior.

In the case of small mains follow currents, which must be switched off by the extinguishing aid 36, the active connection of a matched small capacitor can be sufficient to extinguish the arc. The gradual charging of the capacitor also limits the steepness of the voltage build-up, which greatly reduces the risk of re-ignition of the spark gap 14.

To achieve sufficiently short overall switch-off times, it can be useful to prevent the capacitor from being fully charged to the mains voltage. The size of the capacitor can also be selected in a manner adaptable to the load. This is possible, for example, by cascaded switching-on of further capacitors depending on the charging voltage and/or time. In this way, the extinguishing process can be optimized with regard to the success of the extinguishing and the duration with regard to the actual demand. For the operation of such an arrangement, passive or active discharging of the charged capacitor(s) after a switching operation and, if necessary, additional overvoltage protection are also useful.

In addition to the simple connection of the resonant circuit at low currents in the spark gap 14, precharging of the energy storage device used in the RLC element or active excitation of the oscillation by inductive coupling can also be provided in the resonant circuit tuning.

FIG. 11 shows a ninth embodiment of a surge arrester 10 according to the present disclosure, which uses a spark gap 14 operating on the basis of a pressure build-up or a gas flow within at least one arc channel 62.

Such spark gaps 14 generate, for example, a high pressure, a strong gas flow or a combination thereof via the formation of a hard gas in the arc channel 62 between main electrodes 64. This can generate a high arc voltage of the arc, which can limit and extinguish the arc.

As already described above, such current-limiting spark gaps 14 can be connected in series with the separate modules 55 with extinguishing aids 36 already described, in accordance with the so-called Radax flow principle, without further modifications.

However, similar to horn spark gaps, integration in or on the spark gap 14 is also possible by minor modifications. To utilize the current-limiting effect of the spark gap 14, a third potential connection is required for the connection of the extinguishing aid 36 in addition to the main connections. The extinguishing aid 36 is connected between a main connection and the further potential connection. The potential connection has contact to the arc channel 62 and only taps part of the arc voltage. Present parts such as intermediate electrodes or trigger electrodes etc. can be used as the potential connection. It is however also possible to introduce additional electrodes.

FIG. 11 shows the arc channel 62 running in a straight line. However, other geometric configurations of the arc channel 62 are also conceivable.

The arc channel 62 is surrounded by a hard gas-emitting material 66.

An optical sensor 39 is arranged in the arc channel 62, by means of which it is possible to detect the occurrence and burning duration of an arc.

The spark gap 14 has an ignition aid 24 with an auxiliary ignition electrode 26, via which the arc in the arc channel 62 can be ignited.

Furthermore, an additional connection electrode 68 is provided, which is connected to the extinguishing aid 36 in an electrically conductive manner.

In the embodiment shown, the extinguishing aid 36 is designed as a countercurrent circuit analogous to FIG. 10. However, other types of extinguishing aids 36 as described above can in principle also be used.

When the spark gap 14 is activated, the connecting electrode 68 is in contact with the arc that forms between the main electrodes 64, so that in relation to the contact area of the connecting electrode 68, two partial areas of the arc respectively exist to a main electrode.

Due to the arrangement shown in FIG. 11, the extinguishing aid 36 does not have to be parallel-connected with the spark gap 14 and is also not directly connected to the DC mains 12, so that it can be reliably ruled out that currents flow via the extinguishing aid 36 that could damage the latter.

The countercurrent circuit of the extinguishing aid 36 extinguishes one of the partial arcs, as a result of which the entire arc also comes to a standstill. Another advantage of choosing a countercurrent principle is that there is no reduction in the current limitation before extinguishing due to the need for commutation.

The activation of the extinguishing aid 36 takes place via the evaluation module 38, wherein the latter can optionally make use of the data received from the magnetic field sensor 40, the current sensor 35, the optical sensor 39 and/or a voltage sensor 70 to identify at least two tripping conditions which are characteristic of the fact that the spark gap 14 alone cannot extinguish the mains follow current within the specified time duration. It is understood that in this embodiment, the type, number and/or arrangement of sensors may also differ from the variant shown in FIG. 11.

When using an extinguishing aid 36 with a commutation principle, several factors must be taken into account.

The current-limiting effect of spark gaps 14 based on a pressure build-up or a gas flow depends on the load. The pressure level depends, among other things, on the current level of the impulse current and/or the mains follow current. If such a spark gap 14 is thus activated in the event of a low-energy disturbance variable in a DC mains 12 with a small mains follow current below the current threshold of the extinguishing aid 36, the pressure build-up cannot take place within a sufficiently short time, as a result of which an occurring mains follow current cannot always be extinguished or limited. In this case, however, the activation of the extinguishing aid 36 is always successful, as the mains follow current is lower than the extinguishing limit of the extinguishing aid 36.

However, if a larger current is limited below the extinguishing limit without the current being extinguished quickly and independently, there may be a risk with a simple extinguishing aid 36 based on the hybrid principle that the low-resistance short-circuiting of a section of the arc will cause the current to rise again and exceed its extinguishing limit.

Care must therefore be taken not to significantly reduce the current limitation by activating such an extinguishing aid 36. It can be advantageous to extinguish the part of the arc with a lower voltage drop (e.g. due to a shorter length or a lower electric field strength) and to seal off the area with the extinguished arc from the further existing arc, for example using covers or a flow shadow.

Due to the relatively strong current limitation in these spark gaps, the partial voltages of the sections of the arc are quite high. This also allows complete commutation of the current from the spark gap 14 into the extinguishing aid 36 with high impedance of the electric circuit of the extinguishing aid 36. Due to an integration of a passive or active impedance or the successive adaptation or non-linear characteristic thereof, the influence on the current limitation remains low and the extinguishing process can be achieved despite the limited current carrying capacity and shut-off capacity of the extinguishing aid 36.

Should an overload of the extinguishing aid 36 nevertheless occur, the path of the extinguishing aid 36 can be blocked comparatively quickly, for example by means of a semiconductor such as an IGBT, without initiating an extinguishing process in the extinguishing aid 36, i.e. without waiting for a minimum delay time.

In this case, in the event of an emergency switch-off of the extinguishing aid 36, the spark gap 14 ignites again or does not go out and the extinguishing aid 36 is relieved immediately. Since the extinguishing aid 36 thus remains intact due to this self-protection function, further extinguishing attempts can be carried out using the extinguishing aid 36, for example based on a timing and/or on other specified criteria. In the event of multiple failed attempts, additional protective elements (not shown) can be activated as already described.

Overall, the surge arrester 10 according to the present disclosure is characterized by a reliable handling of occurring impulse and mains follow currents. In addition, the structure and complexity of the components used in the surge arrester 10 can be simplified such that an optimum compromise between cost and reliability is achieved when (safely) discharging impulse currents and extinguishing mains follow currents.

The invention claimed is:

1. A surge arrester for DC mains, comprising
a spark gap for extinguishing mains follow currents in the DC mains, the current intensity of which is equal to or greater than a specified current threshold,
a triggerable extinguishing aid assigned to the spark gap, which is set up to extinguish mains follow currents below the specified current threshold, and
an evaluation module for triggering the triggerable extinguishing aid, the evaluation module being set up to trigger the triggerable extinguishing aid as soon as at least two tripping conditions are fulfilled which are characteristic of the fact that the spark gap alone cannot extinguish the mains follow current within a specified time duration.

2. The surge arrester according to claim 1, wherein the at least two tripping conditions are based on at least two of the following parameters: an occurrence, a position, a movement and/or a burning duration of an arc in the spark gap, an activation of an ignition aid of the spark gap, a current flow in the path of the DC mains assigned to the surge arrester, and a falling below the specified current threshold in the path of the DC mains assigned to the surge arrester.

3. The surge arrester according to claim 1, wherein the surge arrester comprises an optical sensor for detecting an arc in the spark gap, a current sensor for measuring current intensities in the DC mains and/or a voltage sensor.

4. The surge arrester according to claim 1, wherein the specified current threshold is less than 100 A and/or wherein the specified time duration is shorter than 10 ms.

5. The surge arrester according to claim 1, wherein the triggerable extinguishing aid is a hybrid circuit, a snubber circuit, a countercurrent circuit, an active resonant circuit and/or a passive resonant circuit.

6. The surge arrester according to claim 1, wherein the surge arrester has a backup protective device which is set up to disconnect the spark gap and/or the triggerable extinguishing aid from the DC mains if a current occurs in the path of the DC mains assigned to the surge arrester which would lead to damage to the spark gap and/or the triggerable extinguishing aid.

7. The surge arrester according to claim 1, wherein the evaluation module has a machine learning module which is set up to adapt the specified current threshold, the specified time duration and/or the considered tripping conditions on the basis of a training data set and/or a data set comprising information about mains follow currents handled by the surge arrester in the past.

8. The surge arrester according to claim 1, wherein the triggerable extinguishing aid is designed as a separate module which is connected in parallel with the spark gap or which is connected in series with the spark gap.

9. The surge arrester according to claim 1, wherein the surge arrester comprises a plurality of series-connected spark gaps, wherein the triggerable extinguishing aid is assigned to at least one of the spark gaps.

10. A method of operating a surge arrester for DC mains, comprising the following steps:
detecting by means of an evaluation module of the surge arrester whether at least two tripping conditions are fulfilled which are characteristic of the fact that a spark gap of the surge arrester alone cannot extinguish an occurring mains follow current in the DC mains within a previously specified time duration, and, if this is the case,
triggering an extinguishing aid of the surge arrester by means of the evaluation module.

11. The method according to claim 10, wherein the extinguishing aid remains passive if the spark gap itself is able to extinguish the occurring mains follow current within the previously specified time duration, and wherein the extinguishing aid is activated if the spark gap itself is not able to extinguish the occurring mains follow current within the previously specified time duration.

12. The method according to claim 10, wherein an arc in the spark gap is detected by means of an optical sensor, a current intensity in the DC mains is measured by means of a current sensor, and/or a voltage is measured by means of a voltage sensor, wherein the optical sensor, the current sensor and/or the voltage sensor detect(s) at least one parameter, based on which the at least two tripping conditions are checked.

13. The method according to claim 10, wherein the spark gap and/or the extinguishing aid are disconnected from the DC mains if a current occurs in the path of the DC mains assigned to the surge arrester which would lead to damage of the spark gap and/or the extinguishing aid.

14. The method according to claim 10, wherein parameters for the operation of the surge arrester are continuously adjusted.

15. The method according to claim 10, wherein information about the expected behavior of the spark gap is taken into account to determine whether or not the spark gap alone can extinguish the occurring mains follow current in the DC mains within the specified time duration.

16. The surge arrester according to claim 1, wherein the evaluation module is configured to trigger the triggerable extinguishing aid only when the at least two tripping conditions are fulfilled which are characteristic of the fact that the spark gap alone cannot extinguish the mains follow current within the specified time duration.

* * * * *